United States Patent [19]

Lotz et al.

[11] Patent Number: 4,917,906
[45] Date of Patent: Apr. 17, 1990

[54] PROCESS FOR PRESERVING RAW MEAT WITH A BACTERIA-LYSING ENZYME FROM STREPTOMYCETES

[75] Inventors: Andreas Lotz, Frankfurt am Main; Gerhard Wöhner, Flörsheim am Main; Christian Klug, Schwalbach am Taunus; Erich Lück, Bad Soden am Taunus; Gert-Wolfhard von Rymon Lipinski, Frankfurt am Main, all of Fed. Rep. of Germany

[73] Assignee: Hoechst Aktiengesellschaft, Frankfurt, Fed. Rep. of Germany

[21] Appl. No.: 145,304

[22] Filed: Jan. 19, 1988

[30] Foreign Application Priority Data

Jan. 21, 1987 [DE] Fed. Rep. of Germany ....... 3701565

[51] Int. Cl.4 .......................... A23L 1/31; A23L 1/315
[52] U.S. Cl. .......................................... 426/56; 426/59
[58] Field of Search ..................... 426/7, 9, 55, 56, 59, 426/60, 61, 62

[56] References Cited

U.S. PATENT DOCUMENTS 3,929,579 12/1975 Yoshimura et al. ................. 195/62
3,985,869 10/1976 Yoshimura et al. ................. 424/50

FOREIGN PATENT DOCUMENTS 7203141 11/1968 Japan ..................................... 426/56
85-8564 11/1985 South Africa .
1369874 9/1971 United Kingdom .

Primary Examiner—Marianne Cintins
Attorney, Agent, or Firm—Finnegan, Henderson, Farabow, Garrett and Dunner

[57] ABSTRACT

A bacteria-lysing enzyme product from streptomycates can preserve poultry and fresh meat products. It effects a reduction in the organism count, by acting not only on Gram-positive organisms but also on Gram-negative bacteria such as, for example, Enterobacteriaceae.

6 Claims, No Drawings

PROCESS FOR PRESERVING RAW MEAT WITH A BACTERIA-LYSING ENZYME FROM STREPTOMYCETES

The isolation of a bacteria-lysing enzyme product from Streptomycetes is known and has been described, for example, in German Offenlegungsschriften Nos. 2,011,935, 2,040,440, 2,146,597 and 3,440,735.

Raw meat products such as, for example, minced meat, poultry, sausage meat or raw offal represent products at high microbiological risk, especially in the case of inadequate cold storage. These products are sold raw, and some of them are also consumed raw, or are processed further.

Investigations have shown that such meat products are infested predominantly by bacteria of the genera Pseudomonas, Lactobacillus and Bacillus, and by Enterobacteria. The mesophilic total organism count is in the range from $10^4$ to $10^8$ CFU/g. Even with cold storage, the organism counts rise sharply within a short period. It is therefore desirable to keep the contamination as low as possible in such raw products, so that, in particular, sausages having low organism counts can be obtained even when such products are further processed.

Hitherto, preservation of raw poultry and meat products has been achieved by cold storage or by spraying with sprays containing edible acids. As a result, however, the pH value of the products can be lowered to such an an extent that subsequent further processing of the poultry or meat products is rendered difficult. An adequate chain of cold storage units is frequently not available.

It has now been found, surprisingly, that a bacteria-lysing enzyme product from Streptomycetes effects a reduction of the total organism count in poultry and fresh meat products. The product acts not only on Gram-positive organisms but also on Gram-negative bacteria such as, for example, Enterobacteriaceae. An inhibiting action, especially on Salmonellae, is desirable.

The invention thus relates to a process for preserving poultry and fresh meat products, which comprises adding a bacteria-lysing enzyme product from Streptomycetes to the said meat products.

The invention is explained below in detail, especially in the preferred embodiments. The invention is also defined in the patent claims.

In principle, and lysozyme-type product from Streptomycetes can be used according to the invention. In culture media of simple composition, a high yield of bacteria-lysing enzyme product is achievable by means of Streptomycetes at a fermentation period of 1 to 7 days. Preferably, however, the bacteria-lysing enzyme product obtained according to German Offenlegungsschrift No. 3,440,735 from Streptomyces coelicolor DSM 3030 or its variants and mutants is used.

In the case of culturing Streptomyces coelicolor DSM 3030, an addition of sugar beet molasses in a quantity of 5 to 50 g, preferably 10 to 20 g, per liter of culture medium has proved particularly advantageous. A further increase in yield is obtained when calcium ions in the form of readily soluble, non-toxic calcium salts, preferably in the form of the inexpensive calcium chloride, are added to the culture medium. A 0.05 to 1 molar calcium ion concentration is advantageous, and concentrations of 100 to 500 mmol, for example in the form of an addition of 0.2 to 0.5% by weight of calcium chloride dihydrate, are particularly preferred.

Essentially, all raw meat products such as, for example, relatively large pieces of meat, diced meat and also minced meat and minced meat products, poultry, frying sausages and semi-finished simmering sausages can be preserved according to the invention with the bacteria-lysing enzyme product.

Depending on the meat product, the bacteria-lysing enzyme product can be applied in different ways. This can be effected, for example, by injecting an enzyme concentrate ($10^5$–$10^6$ units/ml) into individual pieces of meat. For this purpose, meat is, as is usual in meat processing, cut up, sorted and diced to give smaller pieces. The solution of active ingredient is injected by means of an injection needle as uniformly as possible into these individual meat cubes (of a few centimeters edge length). If relatively large individual pieces of meat are to be preserved, such as, for example, ham on the bone, the active ingredient solution can also be applied by deep injection, as is usual in the treatment with solutions of nitrile pickling salt. If comminution of the piece of meat, for example by mincing, is necessary, this can be carried out after the treatment described above.

The bacteria-lysing enzyme product can, furthermore, also be mixed in after the pre-comminution of the raw meat products. The diced meat is thoroughly mixed after the enzyme concentrate has been added. In this case, the procedure should be batchwise, in order to ensure uniform mixing.

A further possible way of application is to spray on aqueous solutions of the bacteria-lysing enzyme product. In this case, the active ingredient solution can be uniformly sprayed even onto relatively large hung pieces of meat. It is then logical to use the product in the highest possible dosage ($10^5$–$10^6$ units/ml) in aqueous solution, so that excessive moistening of the surface can be prevented and the meat can soak up the active ingredient.

As the last of the possible ways of application listed by way of example, immersion of individual meat particles into the active ingredient solution should here also be mentioned. For example, 3 to 10%, and preferably 5%, active ingredient solutions should be prepared for this purpose, and the meat should be briefly immersed for a few seconds.

The enzyme can also be applied to the meat together with edible acids, for example lactic acid, acetic acid, tartaric acid and citric acid.

Whatever application method is chosen, the quantity of enzyme product remaining in or on the meat should be 10 to 200 units/mg of meat, preferably 50 to 100 units/mg of meat.

Although higher concentrations can also be used, since an excess of bacteria-lysing enzyme product does not manifest itself adversely, this is not useful for reasons of economics.

The subsequent testing of the action of the bacteria-lysing enzyme product is carried out by methods known per se, by sampling after 1 to 2 days and determining the organism count on selective nutrient media for detecting the aerobic total organism count of Enterobacteria, Staphylococci and Bacillus.

When raw meat products having an initial contamination of $10^5$ to $10^6$ organisms/g are treated with bacteria-lysing enzyme product under the conditions according to the invention, an organism count reduction by 90% can be found within 24 hours at a storage temperature of 6° to 10° C.

In the case of storage for 48 to 72 hours, differences in the organism counts of 2 powers of ten arise between treated and untreated samples. Whereas the organism counts in untreated samples rise sharply, namely to about $10^8$ CFU/g in 48 hours, the rise of the organism counts in treated samples is substantially slower.

The invention is explained in more detail in the examples which follow. Percentages are by weight, unless otherwise stated.

EXAMPLES 1. 10 ml of a spore suspension of Streptomyces coelicolor DSM 3030 were used as the inoculation material for a fermentation with 5 liters of culture medium in an 8 liter fermenter.

| Fermentation conditions: | |
|---|---|
| Culture medium: | 1% of glucose |
| | 2% of molasses |
| | 0.5% of soya flour |
| | 0.5% of casein peptone |
| | 0.2% of $CaCl_2 \times 2H_2O$ |
| pH value: | 6.3 |
| Temperature: | 33° C. |
| Stirrer speed: | 300 rpm |
| Air rate: | 3 liters/minute |

After a fermentation period of 4 days, the sucrose concentration (from the molasses) had fallen to about zero. The cells were separated off by centrifuging, and the bacteria-lysing enzyme product was isolated from the culture supernatant by alcohol precipitation, ion exchanger chromatography, ultra-filtration and gel filtration.

Determination of the activity of bacteria-lysing enzyme product.

0.2 ml of samples containing bacteria-lysing enzyme product is pipetted to 2.8 ml of a suspension of 0.2 mg of Micrococcus luteus ATCC 4698 (Boehringer Mannheim) per ml of 0.1 molar sodium acetate buffer (pH 5.0), and the decrease in turbidity is determined at 25° C. by measuring the extinction at 450 nm. One unit is defined as the decrease in extinction by 0.001 photometer scale units per minute.

2. 1000 g each of pork, from which fat has been roughly removed, and of beef, from which sinews have been roughly removed, are cut into large cubes of 5 cm edge length. 200 ml of the bacteria-lysing enzyme concentrate ($10^6$ units/ml) are injected by means of an injection needle into the pieces of meat, which are then comminuted in a mincer. The minced meat is stored at 5° to 10° C. 5 g samples for an organism count determination are taken after 24 and 48 hours. After an initial dilution with sterile water in the ratio of 1:10, the sample is homogenized and, after preparing a dilution series, plated out on foodstuff organism count agar and selective nutrient media. The plates are incubated for 1 to 2 days at 30° or 37° C.

In the case of meat which has been stored for 24 hours and has an initial contamination of $7 \times 10^5$ CFU/g, an organism count of $2 \times 10^5$ is found in treated samples, whereas untreated samples contain $6 \times 10^6$ organisms. After storage for 48 hours, treated samples show an organism count of $2 \times 10^6$ and untreated samples show an organism count of $2 \times 10^8$.

3. Pieces of pork, from which fat has been roughly removed, and pieces of beef, from which sinews have been roughly removed, are immersed for 1 minute into a 5% aqueous solution of a bacteria-lysing enzyme product. The immersed pieces of meat are then stored at 5° C.

For the organism count determination according to Example 2, 5 g of meat are taken from the surface. In the case of an initial contamination of $5 \times 10^6$ organisms (aerobic total organism count)/g, untreated meat shows a surface contamination of $9 \times 10^6$ organisms/g after 24 hours, whereas the treated pieces of meat are contaminated with $9 \times 10^4$ to $5 \times 10^5$ organisms/g.

4. Hung pieces of meat of 5 kg weight are sprayed with 500 ml of a bacteria-lysing enzyme concentrate ($10^4$ units/ml) by means of an atomizer. The organism count determination after a storage period at 5° C. is carried out in accordance with Example 2. Here again, differences of the above orders of magnitude (factors of 10 to 100) in the aerobic total surface organism count between treated and untreated samples are found. The surface contamination was determined by the method of taking a cast at an initial contamination of $3 \times 10^6$ organisms/$cm^2$.

We claim:

1. A process for preserving a raw meat product, which comprises applying a bacteria-lysing enzyme from Streptomycetes to said meat product to provide at least about 10 units/mg of said enzyme in or on said meat product.

2. The process as claimed in claim 1, wherein the bacteria-lysing enzyme is isolated from Streptomyces coelicolor DSM 3030 or its variants and mutants.

3. The process as claimed in claim 1, wherein 10 to 200 units of the bacteria-lysing enzyme are applied per mg of meat product.

4. The process as claimed in claim 3, wherein 50 to 100 units/mg of bacteria-lysing enzyme are applied per mg of product.

5. The process as claimed in claim 1, wherein the bacteria-lysing enzyme is applied together with an edible acid.

6. The process as claimed in claim 1, wherein said meat is poultry.

* * * * *